(12) United States Patent
An et al.

(10) Patent No.: US 11,743,726 B2
(45) Date of Patent: Aug. 29, 2023

(54) ACCESS METHOD AND SYSTEM OF INTERNET OF THINGS EQUIPMENT BASED ON 5G, AND STORAGE MEDIUM

(71) Applicants: SHENZHEN GAS CORPORATION LTD., Guangdong (CN); SHENZHEN GAS TECHNOLOGY RESEARCH INSTITUTE, Guangdong (CN)

(72) Inventors: Chengming An, Shenzhen (CN); Guang Yang, Shenzhen (CN); Wenxiang Wang, Shenzhen (CN); Jing Zhang, Shenzhen (CN); Wei Meng, Shenzhen (CN); Chao Xu, Shenzhen (CN)

(73) Assignees: SHENZHEN GAS CORPORATION LTD., Shenzhen (CN); SHENZHEN GAS TECHNOLOGY RESEARCH INSTITUTE, Shenzhen (CN)

( * ) Notice: Subject to any disclaimer, the term of this patent is extended or adjusted under 35 U.S.C. 154(b) by 96 days.

(21) Appl. No.: 17/612,353

(22) PCT Filed: May 8, 2021

(86) PCT No.: PCT/CN2021/092472
§ 371 (c)(1),
(2) Date: Nov. 18, 2021

(87) PCT Pub. No.: WO2022/052493
PCT Pub. Date: Mar. 17, 2022

(65) Prior Publication Data
US 2022/0312208 A1    Sep. 29, 2022

(30) Foreign Application Priority Data
Sep. 8, 2020  (CN) .......................... 202010938143.2

(51) Int. Cl.
*H04W 12/71* (2021.01)
*H04W 12/069* (2021.01)
(Continued)

(52) U.S. Cl.
CPC .......... *H04W 12/069* (2021.01); *G16Y 30/10* (2020.01); *H04W 12/033* (2021.01);
(Continued)

(58) Field of Classification Search
CPC ............................. H04W 12/06; H04W 12/71
See application file for complete search history.

(56) References Cited

U.S. PATENT DOCUMENTS 10,064,059 B1    8/2018 Yu
10,721,122 B1    7/2020 Argenti
(Continued)

FOREIGN PATENT DOCUMENTS

CN    101800640 A    8/2010
CN    104796265 A    7/2015
(Continued)

OTHER PUBLICATIONS

Chinese First Examination Report dated Jun. 23, 2021 in corresponding Chinese Application No. 202010938143.2; 11 pages.
(Continued)

*Primary Examiner* — Michael T Vu
(74) *Attorney, Agent, or Firm* — Maier & Maier, PLLC

(57) ABSTRACT

A 5G-based Internet of Things device access method and system, and storage medium. Method includes steps that IoT access platform generates authentication identification of to-be-accessed IoT device according to device identification of to-be-accessed IoT device, and carries out identity authentication of to-be-accessed IoT device through authentication identification, and identity authentication result is sent to to-be-accessed IoT device so when identity authen-
(Continued)

tication result received by to-be-accessed IoT device is that identity authentication is passed, to-be-accessed IoT device accesses IoT access platform and performs encrypted data communication. Method is advantaged in that legal identity of to-be-accessed IoT equipment is verified by taking equipment fingerprint as authentication identifier, and data integrity of to-be-accessed IoT equipment is ensured through access authentication, so illegal terminal is prevented from accessing IoT access platform, and security of data transmission is improved.

8 Claims, 2 Drawing Sheets

(51) Int. Cl.
    *G16Y 30/10*     (2020.01)
    *H04W 12/033*     (2021.01)
    *H04W 12/10*     (2021.01)
    *H04W 48/18*     (2009.01)

(52) U.S. Cl.
    CPC ........... *H04W 12/10* (2013.01); *H04W 12/71* (2021.01); *H04W 48/18* (2013.01)

(56) References Cited

U.S. PATENT DOCUMENTS

| | | | | |
|---|---|---|---|---|
| 11,379,213 | B1* | 7/2022 | Ansay | G06F 21/57 |
| 2020/0076896 | A1* | 3/2020 | Anumala | H04W 4/70 |
| 2020/0112855 | A1* | 4/2020 | Zhan | H04L 61/50 |

FOREIGN PATENT DOCUMENTS

| | | |
|---|---|---|
| CN | 108418834 A | 8/2018 |
| CN | 109347635 A | 2/2019 |
| CN | 109412816 A | 3/2019 |
| CN | 109617675 A | 4/2019 |
| CN | 109981292 A | 7/2019 |
| CN | 110324287 A | 10/2019 |
| CN | 110535877 A | 12/2019 |
| CN | 110995759 A | 4/2020 |
| CN | 111404991 A | 7/2020 |
| CN | 112218294 A | 1/2021 |

OTHER PUBLICATIONS

Translation of International Search Report dated Aug. 6, 2021 in corresponding International Application No. PCT/CN2021/092472; 3 pages.

\* cited by examiner

ACCESS METHOD AND SYSTEM OF INTERNET OF THINGS EQUIPMENT BASED ON 5G, AND STORAGE MEDIUM

CROSS-REFERENCE TO RELATED APPLICATIONS

This application is a national application of PCT Patent Application No. PCT/CN2021/092472, filed on May 8, 2021, which claims priority to Chinese Patent Application No. 202010938143.2, filed on Sep. 8, 2020. The content of all of which is incorporate herein by reference.

FIELD

The present disclosure relates to the technical field of access security processing, in particular to an access method and system of an Internet of Things equipment based on 5G, and a storage medium.

BACKGROUND

Advent of 5G era can not only provide people with a more convenient mobile Internet service, but also become a key technology for an Internet of Everything, relying on a plurality of characteristics thereof including a high-speed, a large-capacity, a low-latency and a high-reliability. With a continuous high speed access of massive Internet of Things (IoT) equipments to a 5G network, various network security issues have become a problem to be solved urgently.

An IoT equipment itself has a plurality of characteristics including a complex type and a large number. With a rapid development of the 5G network, while an order of magnitude of the IoT equipments access increases, a wide range of hazards and a dissemination capability of a security issue among the IoT equipments have also got increased, a plurality of problems and challenges are existing.

(1) The IoT equipments comprise a plurality of equipments with various types and different architectures, including a sensor, an industrial PLC, a smart camera and more, it is difficult to achieve a safety management and control to the equipments through a unified measure. Currently, most companies are achieving a full life cycle management to the IoT equipment by a device identity (ID). However, due to a limited resources in the equipment itself, it is impossible to provide a protection function against an ID tampering and an ID forgery, making a plurality of security incidents happen frequently in the IoT, including counterfeiting a terminal, fake data, and an attack by a man-in-middle. Thus a more secure identification means must be applied to achieving a unified ID management for the IoT equipments.

(2) An access of a huge number of the IoT equipments makes a traditional security access measure too complicated, bringing an unbearable computational burden to a security access protection system in a center. A traditional border security access protection system is usually based on an IPSec VPN or an SSL VPN technology before providing a plurality of secure access functions including an ID mutual authentication, a transmission data encryption, an access control and more, during a process of a remote equipment access. However, facing to a security access requirement from the huge number of the IoT equipments in a 5G scenario, a more efficient and streamlined authentication and encryption scheme must be adopted, to reduce a security access pressure thereof.

Therefore, the current technology needs to be improved and developed.

SUMMARY

According to the defects in the prior art described above, the present disclosure provides an access method and system of an IoT equipment based on 5G, and a storage medium, applied to solving a technical problem in the prior art that, an IoT equipment has a low security when accessing a platform.

The technical solution of the present disclosure to solve the technical problems is as follows:

a first aspect of the present disclosure provides an access method of an IoT equipment based on 5G, comprising:
an IoT equipment to be accessed sends an access request to an IoT access platform, wherein the access request carries a device ID of the IoT equipment to be accessed;
the IoT access platform receives and parses the access request to obtain the device ID, generates an authentication ID of the IoT equipment to be accessed according to the device ID, and performs an ID authentication to the IoT equipment to be accessed according to the authentication ID, so as to feed back an ID authentication result to the IoT equipment to be accessed;
when the ID authentication result received by the IoT equipment to be accessed is the ID authentication success, the IoT equipment to be accessed accesses the IoT access platform.

The access method, wherein the IoT access platform generates the authentication ID of the IoT equipment to be accessed according to the device ID, comprising:
the IoT access platform acquires a target characteristic parameter information of the IoT equipment to be accessed according to the device ID;
the IoT access platform performs a Hash operation on the target characteristic parameter information and the device ID to obtain the authentication ID of the IoT equipment to be accessed.

The access method, wherein the IoT access platform acquires the target characteristic parameter information of the IoT equipment to be accessed according to the device ID, comprising:
the IoT access platform determines whether the IoT equipment to be accessed is a first time access or not, according to the device ID;
when it is determined that the IoT equipment to be accessed is the first time access, the IoT access platform detects the IoT equipment to be accessed in an active detection manner, to obtain a reference characteristic parameter information of the IoT equipment to be accessed;
the IoT access platform performs a preprocessing onto the reference characteristic parameter information, to obtain the target characteristic parameter information of the IoT equipment to be accessed, wherein the preprocessing comprises an aggregation processing, a filtering processing, a characteristic extraction processing and a clustering processing.

The access method, wherein the IoT access platform performs the ID authentication to the IoT equipment to be accessed according to the authentication ID, so as to feed back the ID authentication result to the IoT equipment to be accessed, comprising:
the IoT access platform generates an SM9 cryptographic ID of the authentication ID through an SM9 ID based cryptographic algorithms, and takes the SM9 cryptographic ID as a public key;

the IoT access platform calculates an SM9 algorithm private key of the IoT equipment to be accessed by a key generation center, and generates randomly a first random number;

the IoT access platform sends the SM9 algorithm private key and the first random number to the IoT equipment to be accessed, to obtain a signature information of the IoT equipment to be accessed;

after receiving the signature information, the IoT access platform verifies the signature information with the authentication ID, to determine whether the IoT equipment to be accessed is a legitimate terminal or not;

when the signature information is consistent with the authentication ID, it is determined that the IoT equipment to be accessed is a legitimate terminal, then the IoT access platform feeds back an ID authentication result of the ID authentication success, to the IoT equipment to be accessed;

when the signature information is inconsistent with the authentication ID, it is determined that the IoT equipment to be accessed is an illegal terminal, then the IoT access platform feeds back an ID authentication result of the ID authentication failure to the IoT equipment to be accessed.

The access method, wherein further comprising:

the IoT equipment to be accessed sends a private key application request to the key generation center, wherein the private key application request carries a registration ciphertext, and the registration ciphertext is generated by encrypting a registration information with the public key generated by the key generation center, the registration information comprises a second random number generated randomly and the device ID;

the key generation center receives the private key application request and obtains the registration ciphertext, before decrypting the registration ciphertext with a private key thereof to obtain the registration information;

the key generation center calculates respectively a signature private key and a data encryption private key of the IoT equipment to be accessed according to the registration information, encrypts the registration result according to the second random number, before sending to the IoT equipment to be accessed, wherein the registration result comprises the signature private key and the encryption private key of the IoT equipment to be accessed.

The access method, wherein when the ID authentication result received by the IoT equipment to be accessed is the ID authentication success, the IoT equipment to be accessed accesses the IoT access platform, further comprising thereafter:

the IoT equipment to be accessed selects the second random number as a symmetric key, and encrypts a symmetric key plaintext by the encryption private key thereof to obtain an access authentication ciphertext;

the IoT equipment to be accessed signs the access authentication application information with the signature private key, to obtain the signature information of the IoT equipment to be accessed, then sends the access authentication application information and the signature information to the IoT access platform; wherein, the access authentication application information comprises the access authentication ciphertext, the device ID, a key application time, and a key validity period;

the IoT access platform performs an access authentication to the IoT equipment to be accessed and the signature information thereof, before feeding back an access authentication result to the IoT equipment to be accessed;

when the access authentication result received by the IoT equipment to be accessed is the access authentication success, the IoT equipment to be accessed accesses the IoT access platform successfully.

The access method, wherein the IoT access platform performs the access authentication to the IoT equipment to be accessed and the signature information thereof, comprising:

the IoT access platform extracts the key application time and the key validity period from the access authentication application information to verify whether the key has expired or not;

when determining that the key has not expired, the IoT access platform verifies the signature information of the access authentication application information to determine whether the access authentication application information is complete;

when determining that the signature information of the access authentication application information is correct, the IoT access platform extracts and decrypts the access authentication ciphertext in the access authentication application information by the symmetric key;

when decrypting successfully and obtaining the symmetrically encrypted plaintext, the IoT access platform determines that the IoT equipment to be accessed has successfully accessed the IoT access platform, and feeds back the access authentication result of access success to the IoT equipment to be accessed.

The access method, wherein when the access authentication result received by the IoT equipment to be accessed is the access authentication success, the IoT equipment to be accessed accesses the IoT access platform successfully, comprising thereafter:

the IoT equipment to be accessed performs a data communication with the IoT access platform through an encryption algorithm, wherein the encryption algorithm comprises a symmetric encryption algorithm and an asymmetric encryption algorithm.

A second aspect of the present disclosure further provides an access system of the IoT equipment based on 5G, to realize the access method of the IoT equipment based on 5G, wherein the access system of the IoT equipment based on 5G comprises an IoT equipment to be accessed and an IoT access platform, and the IoT access platform comprises a device identification module, an ID authentication module, and a data encryption and decryption module;

the IoT equipment to be accessed is applied to sending an access request to the IoT access platform; and accesses the IoT access platform when receiving the ID authentication result of the ID authentication success, wherein the access request carries the device ID of the IoT equipment to be accessed.

the IoT access platform is applied to receiving and parsing the access request to obtain the device ID, generating an authentication ID of the IoT equipment to be accessed according to the device ID, and performing an ID authentication to the IoT equipment to be accessed according to the authentication ID, so as to feed back an ID authentication result to the IoT equipment to be accessed.

A third aspect of the present disclosure further provides a non-transitory computer-readable storage medium, wherein when a processor is executing a plurality of instructions stored in the storage medium, achieving:

the IoT equipment to be accessed sends the access request to the IoT access platform, wherein the access request carries the device ID of the IoT equipment to be accessed;

the IoT access platform receives and parses the access request to obtain the device ID, generates an authentication ID of the IoT equipment to be accessed according to the device ID, and performs an ID authentication to the IoT equipment to be accessed according to the authentication ID, so as to feed back an ID authentication result to the IoT equipment to be accessed;

when the ID authentication result received by the IoT equipment to be accessed is the ID authentication success, the IoT equipment to be accessed accesses the IoT access platform.

Comparing to the prior arts, the present disclosure owns a plurality of following advantages: the access method of the IoT equipment based on 5G, comprises a plurality of following steps: the IoT equipment to be accessed sends the access request to the IoT access platform, wherein the access request carries the device ID of the IoT equipment to be accessed; the IoT access platform receives and parses the access request to obtain the device ID, generates the authentication ID of the IoT equipment to be accessed according to the device ID, and performs the ID authentication to the IoT equipment to be accessed according to the authentication ID, so as to feed back the ID authentication result to the IoT equipment to be accessed; when the ID authentication result received by the IoT equipment to be accessed is the ID authentication success, the IoT equipment to be accessed accesses the IoT access platform. The present disclosure verifies a legal ID of the IoT equipment to be accessed by taking a device fingerprint as the authentication ID, and at a same time, ensures a data integrity of the IoT equipment to be accessed through an access authentication, thereby preventing any one illegal terminal from accessing the IoT access platform, and providing a security for the data transmission.

BRIEF DESCRIPTION OF THE DRAWINGS

In order to explain a plurality of embodiments of the present disclosure or a technical solution in the prior art more clearly, a briefly introduction to the drawings that need to be used in the description of the embodiments or the prior art is stated herein. Obviously, the drawings described herein are a plurality of embodiments described in the present disclosure only. For those ordinary skilled in the art, other drawings can be obtained based on the present drawings without any creative work.

DETAILED DESCRIPTION OF THE EMBODIMENTS

In order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described here are used to explain the present disclosure only, instead of limiting the present disclosure.

Figure 1:
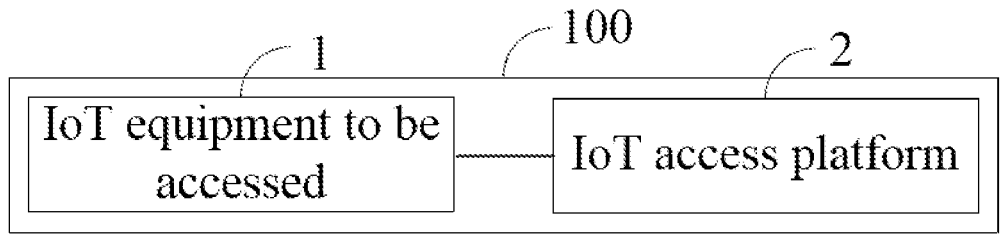
FIG. 1 illustrates a schematic diagram on an operating environment of the access method of the IoT equipment based on 5G in the present disclosure.

FIG. 1 illustrates a schematic diagram on an operating environment being able to realize an access method of an IoT equipment based on 5G in one embodiment of the present disclosure, wherein the operating environment is based on an access system 100 of the IoT equipment based on 5G, comprising an IoT equipment 1 to be accessed and an IoT access platform 2. Wherein the IoT equipment 1 to be accessed may be a mobile terminal, comprising a plurality of smart terminals being able to access Internet, including a cell phone, a laptop, a tablet computer, and more, may also be a fixed terminal, comprising a plurality of devices being able to access the Internet, including a TV, a camera, a printer, or a lamp. The IoT access platform 2 may be a server, a server cluster, a data processing terminal or a cloud and more, that implements a communication between the IoT equipments to be accessed. The IoT equipment 1 to be accessed and the IoT access platform 2 obtain their own private keys respectively through a key generation center. The key generation center, also known as KGC, is trusted by all users and is responsible for generating the private keys for users.

The access system 100 of the IoT equipment based on 5G, wherein the IoT equipment 1 to be accessed sends an access request to the IoT access platform 2, the IoT access platform 2 responds to the access request, verifies an ID legitimacy and an access legitimacy of the IoT equipment 1 to be accessed, and feeds back an access result to the IoT equipment 1 to be accessed. Once both the ID and the access of the IoT equipment 1 to be accessed are legal, the IoT equipment 1 to be accessed will then access the IoT access platform 2 successfully. Of course, if an ID verification of the IoT equipment 1 to be accessed fails, it indicates that either the IoT equipment 1 to be accessed is an illegal terminal, or an access failed (for example, it prompts that a password is incorrect), then the IoT access platform 2 will refuse to access the IoT equipment 1 to be accessed. In such a way, an illegal terminal is prevented greatly from accessing the IoT access platform 2, a security of the access and data is improved, and a pressure onto the IoT access platform 2 is reduced.

In order to further improve the security, when the IoT equipment 1 to be accessed accesses the IoT access platform 2, data is transmitted in an encrypted manner through an encryption algorithm to ensure an integrity of a data transmission process, preventing data leakage, and improving the safety.

In order to further understand a technical solution of the present disclosure, further detailed descriptions of the present disclosure are stated here, referencing to the attached drawings and some embodiments of the present disclosure.

Figure 2:
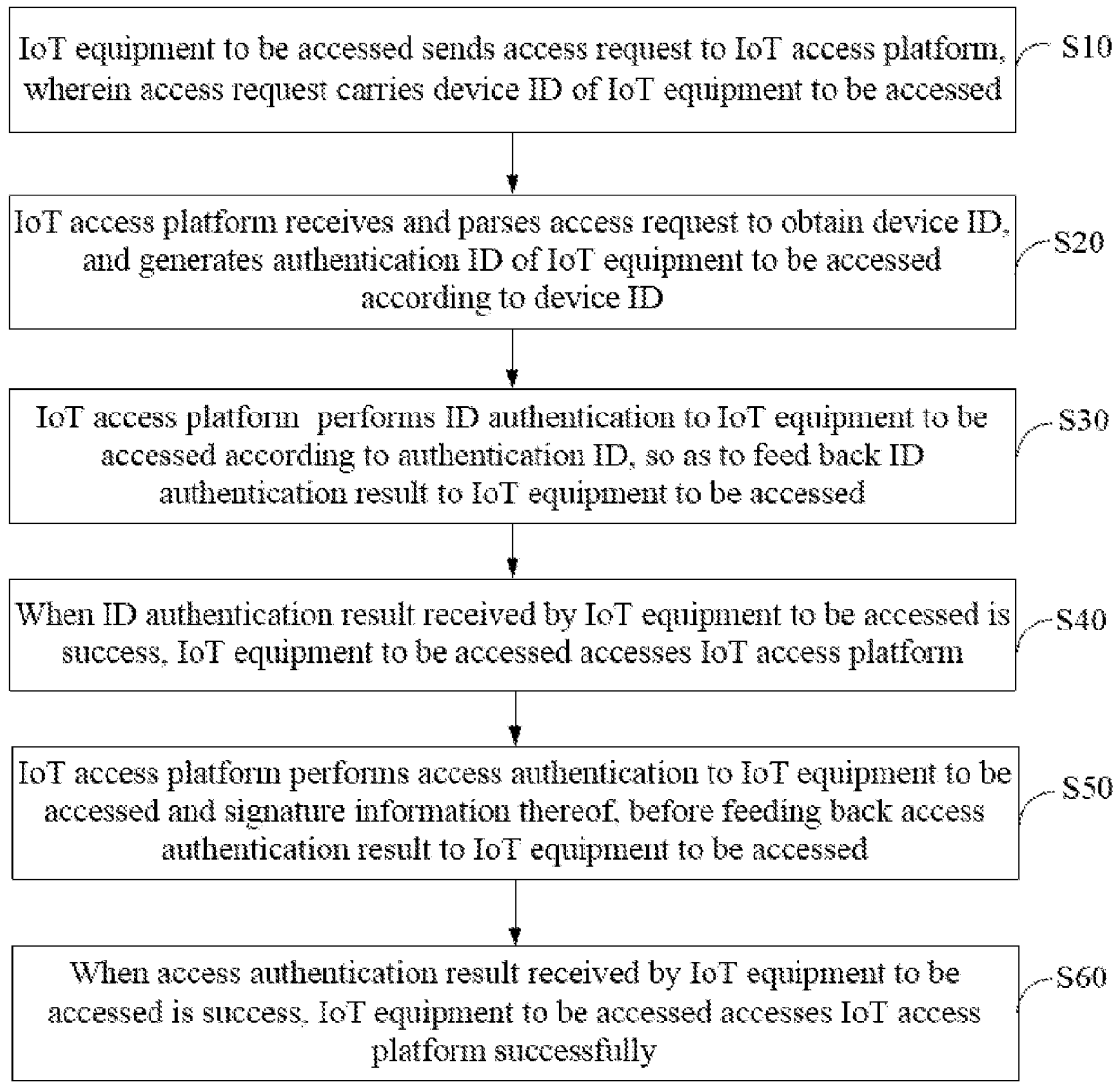
FIG. 2 illustrates a schematic flowchart on the access method of the IoT equipment based on 5G in the present disclosure.

Referencing to FIG. 2. which illustrates a flowchart on the access method of the IoT equipment based on 5G in the present disclosure. It should be noted that, the access method of the IoT equipment based on 5G in the embodiments of the present disclosure is not limited to the steps and sequence in the flowchart shown in FIG. 2, according to different requirements, the steps in the flowchart can be added, removed or changed in sequences.

Shown as FIG. 2, the access method of the IoT equipment based on 5G provided in the present disclosure comprises following steps:

S10. the IoT equipment to be accessed sends an access request to the IoT access platform, wherein the access request carries a device ID of the IoT equipment to be accessed.

The present embodiment, wherein the IoT equipment 1 to be accessed sends an access request to the IoT access platform 2, in a real application, it may be the IoT equipment 1 to be accessed sends the access request to the IoT access platform 2 when registering or logging in to the IoT access platform 2. In the present embodiment, the access request comprises an ID authentication request and an access authentication request. The ID authentication request refers to that the IoT access platform 2 verifies the ID of the IoT equipment 1 to be accessed to ensure a legitimacy of the IoT equipment 1 to be accessed, refusing the IoT equipment 1 to be accessed that fails to pass the ID authentication, while accepting the IoT equipment 1 to be accessed that passes the ID authentication, so as to prevent an illegal terminal from accessing the IoT platform 2, improving a security, and prevent the illegal terminal from stealing any data information, which also ensures a data security. The access authentication request refers to the IoT access platform 2 re-verifying a data integrity of the IoT equipment 1 to be accessed, to ensure that an information security is not damaged or leaked, such as the access authentication request triggered by whether a password is entered correctly during a login.

The access request sent by the IoT equipment 1 to be accessed to the IoT access platform 2 carries a device ID, and the device ID is applied to uniquely identifying the IoT equipment 1 to be accessed, that is, by the device ID, it is possible to locate the IoT equipment 1 to be accessed. In the present embodiment, the device ID is an identity of the equipment. Of course, the device ID can also be an MCU address, and there is no limitations on it in the present disclosure, as long as it is satisfied that the device ID determines the IoT equipment to be accessed uniquely.

S20, the IoT access platform receives and parses the access request to obtain the device ID, and generates an authentication ID of the IoT equipment to be accessed according to the device ID.

Figure 3:
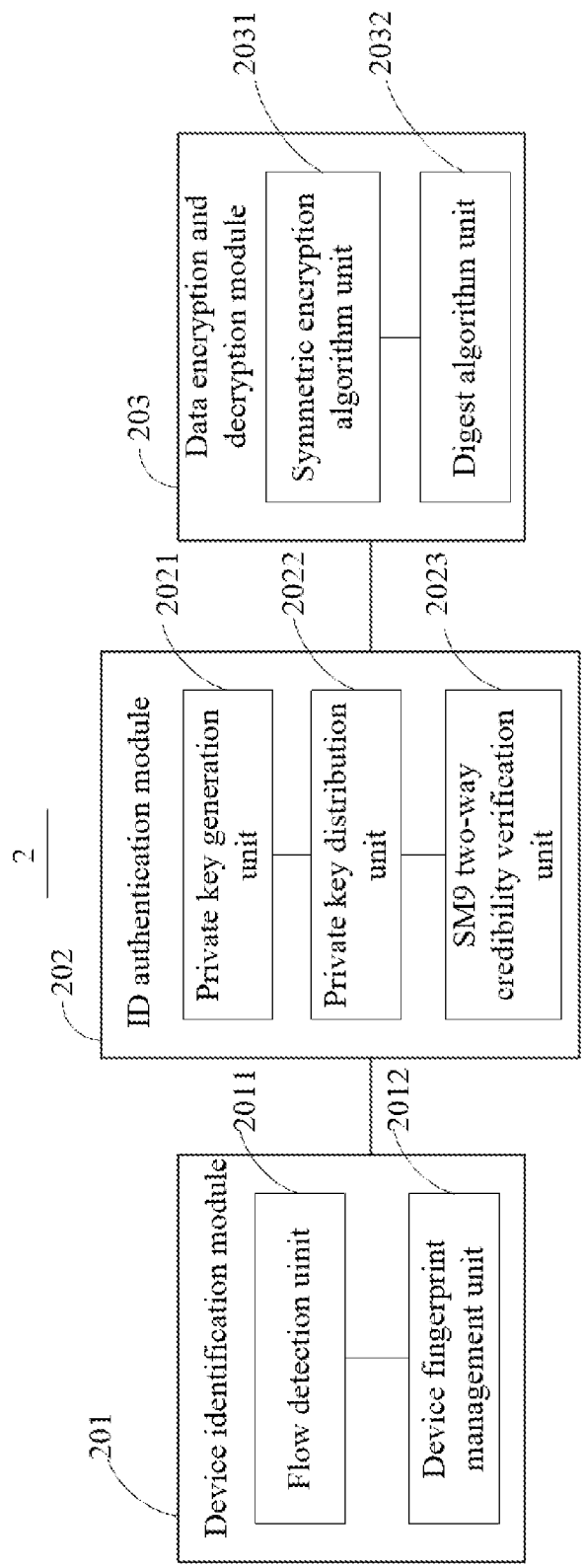
FIG. 3 illustrates a schematic structural diagram on an access platform in the access method of the IoT equipment based on 5G in the present disclosure.

In the present embodiment, the IoT access platform 2 is shown as FIG. 3, comprising a device identification module 201, an ID authentication module 202, and a data encryption and decryption module 203. The device identification module 201 comprises a flow detection unit 2011 and a device fingerprint management unit 2012.

The ID authentication module 202 comprises a private key generation unit 2021, a private key distribution unit 2022, and an SM9 two-way credibility verification unit 2023. The data encryption and decryption module 203 comprises a symmetric encryption algorithm unit 2031 and a digest algorithm unit 2032.

In a real implementation, when receiving the access request, the IoT access platform 2 parses the access request and obtains the device ID of the IoT equipment 1 to be accessed. At this time, the IoT access platform 2 determines whether the IoT equipment 1 to be accessed is a first time access or not, according to the device ID, that is, if a database in the IoT access platform 2 has stored a related information on the IoT equipment 1 to be accessed corresponding to the device ID. Thus, when the IoT access platform 2 did not find by a related information on the IoT equipment 1 to be accessed corresponding to the device ID by searching the database thereof, the flow detection unit 2011 in the device identification module 201 detects actively the IoT equipment 1 to be accessed according to the device ID, to obtain a port information, an operating service category information, and an operating system information of the IoT equipment 1 to be accessed. At a same time, a flux monitoring to the IoT equipment 1 to be accessed is performed, to obtain a device model information, a device category information, a communication protocol information, a device version information and more, of the IoT equipment 1 to be accessed. The device model information, the device category information, the communication protocol information, the device version information, the port information, the operating service category information, and the operating system information are used as a reference characteristic parameter information, then the reference characteristic parameter information is preprocessed to obtain a target characteristic parameter information.

Specifically, the IoT access platform generates the authentication ID of the IoT equipment to be accessed according to the device ID, comprising:

S21, the IoT access platform acquires a target characteristic parameter information of the IoT equipment to be accessed according to the device ID;

S22, the IoT access platform performs a Hash operation on the target characteristic parameter information and the device ID to obtain the authentication ID of the IoT equipment to be accessed.

The authentication ID changes according to a change of the target characteristic parameter information, and at a same time, the authentication ID identifies the IoT equipment 1 to be accessed uniquely during an authentication process. In other words, the authentication ID has a validity period, that is, an Immediacy. Once the authentication ID exceeds the validity period, the authentication ID will be invalid. At a same time, the authentication ID has a fixed length, being obtained through a Hash operation based on the target characteristic reference information and the device ID. In the present embodiment, the authentication ID is a device fingerprint, which is applied as a matching authentication and a traceability of the IoT access platform 2.

The target characteristic parameter information comprises the device model information, the device category information, the communication protocol information, the device version information, the port information, the operating service category information, the operating system information, and more. The target characteristic parameter information is not restricted, which may be customized according to a user's requirement, in an embodiment, the target characteristic parameter information further comprises a hardware configuration information of the IoT equipment 1 to be accessed.

Further, the IoT access platform 2 acquires the target characteristic parameter information of the IoT equipment 1 to be accessed according to the device ID, comprising:

S211, the IoT access platform 2 determines whether the IoT equipment 1 to be accessed is a first time access or not, according to the device ID;

S212, when it is determined that the IoT equipment 1 to be accessed is the first time access, the IoT access platform 2 detects the IoT equipment 1 to be accessed in an active detection manner, to obtain a reference characteristic parameter information of the IoT equipment 1 to be accessed;

S213, the IoT access platform 2 performs a preprocessing onto the reference characteristic parameter information, to obtain the target characteristic parameter information of the IoT equipment 1 to be accessed, wherein the preprocessing comprises an aggregation processing, a filtering processing, a characteristic extraction processing and a clustering processing.

Since the reference characteristic parameter information obtained by the flow detection unit 2011 may come from different data sources, a data information structure obtained by the different data sources must be diverse. In order to improve an efficiency, ensure an accuracy of the IoT equipment 1 to be accessed, and reduce an invalid data information structure, the reference characteristic parameter information acquired thus needs to be preprocessed to obtain a standard target feature parameter information. In the present embodiment, the preprocessing comprises an aggregation processing, a filtering processing, a characteristic extraction processing and a clustering processing. The aggregation processing refers to an aggregation and classification of a plurality of related parameter information of the IoT equipment 1 to be accessed, detected by the flow detection unit 2011 and a plurality of related parameter information corresponding to a flow monitoring. The filtering processing refers to filtering the parameter information after the aggregation according to a certain rules, so as to filter out a plurality of non-reference characteristic parameter information before obtaining the reference characteristic parameter information, and improving an efficiency. The characteristic extraction processing refers to performing a characteristic extraction on the reference characteristic parameter information, to obtain the target characteristic parameter information that is able to characterize the IoT equipment 1 to be accessed. The clustering process refers to aggregating a plurality of parameter information belonging to a same target characteristic, to obtain a plurality of target characteristic reference information.

A security authentication to the IoT equipment 1 to be accessed is performed according to the target characteristic reference information of the IoT equipment 1 to be accessed obtained and the authentication ID generated by the device ID. The security authentication comprises at least one of an ID authentication and an access authentication. In the present embodiment, the security authentication comprises a dual authentication including the ID authentication and the access authentication, according to the ID authentication request and the access authentication request respectively, so as to further improve the security.

S30, the IoT access platform 2 performs the ID authentication to the IoT equipment 1 to be accessed according to the authentication ID, so as to feed back the ID authentication result to the IoT equipment 1 to be accessed.

S31, the present embodiment, wherein a specific process of the ID authentication, that is, the IoT access platform 2 performs the ID authentication to the IoT equipment 1 to be accessed according to the authentication ID, so as to feed back the ID authentication result to the IoT equipment 1 to be accessed, comprises:

S32, the IoT access platform 2 generates an SM9 cryptographic ID of the authentication ID through an SM9 ID based cryptographic algorithms, and takes the SM9 cryptographic ID as a public key;

S33, the IoT access platform 2 calculates an SM9 algorithm private key of the IoT equipment 1 to be accessed by a key generation center, and generates randomly a first random number;

S34, the IoT access platform 2 sends the SM9 algorithm private key and the first random number to the IoT equipment 1 to be accessed, to obtain a signature information of the IoT equipment 1 to be accessed;

S35, after receiving the signature information, the IoT access platform 2 verifies the signature information with the authentication ID, to determine whether the IoT equipment 1 to be accessed is a legitimate terminal or not;

S36, when the signature information is consistent with the authentication ID, it is determined that the IoT equipment 1 to be accessed is a legitimate terminal, then the IoT access platform 2 feeds back an ID authentication result of the ID authentication success, to the IoT equipment 1 to be accessed;

S37, when the signature information is inconsistent with the authentication ID, it is determined that the IoT equipment 1 to be accessed is an illegal terminal, then the IoT access platform 2 feeds back an ID authentication result of the ID authentication failure to the IoT equipment 1 to be accessed.

In another real embodiment, the IoT equipment 1 to be accessed generates a second random number randomly, the second random number is also called a challenge value, and the second random number is generated when triggering a random function. The second random number may be a number, a letter, or a combination of the number and the letter. At a same time, the IoT equipment 1 to be accessed submits the device ID as an ID authentication request to the IoT access platform 2. The private key generation unit 2021 in the IoT access platform 2 takes the authentication ID, that is, an SM9 password ID generated by a device fingerprint, as the public key, calculates the SM9 algorithm private key of the IoT equipment 1 to be accessed by the KGC, and distributes the SM9 algorithm private key and the challenge value to the IoT equipment 1 to be accessed through the private key distribution unit 2022, after the IoT access platform 2 receives the signature information of the IoT equipment 1 to be accessed, the SM9 two-way credibility verification unit 2023 verifies the signature information of the IoT equipment 1 to be accessed through the authentication ID, that is, the device fingerprint. If the signature information is as same as the authentication ID, that means a verification is consistent, that represents the IoT access platform 2 has passed the ID authentication of the IoT equipment 1 to be accessed, before feeding back an ID authentication result of the ID authentication success to the IoT equipment 1 to be accessed. Conversely, if the signature information is not as same as the authentication ID, that is, the verification is inconsistent, that means the IoT access platform 2 has failed to pass the ID authentication of the IoT equipment 1 to be accessed, before feeding back an ID authentication result of the ID authentication failure to the IoT equipment 1 to be accessed.

S40, when the ID authentication result received by the IoT equipment 1 to be accessed is the ID authentication success, the IoT equipment 1 to be accessed accesses the IoT access platform 2.

In the present embodiment, the ID authentication success indicates that the IoT access platform 2 allows an access of the IoT equipment 1 to be accessed, while the ID authentication failure indicates that the IoT access platform 2 refuses to access the IoT equipment 1 to be accessed. When the IoT equipment 1 to be accessed is able to access the IoT access platform 2, it further requires an access authentication before ensuring a successful access to the IoT access platform 2 and a data integrity.

S50, the IoT access platform 2 performs an access authentication to the IoT equipment 1 to be accessed and the signature information thereof, before feeding back an access authentication result to the IoT equipment 1 to be accessed.

Further, the access authentication comprises a private key application and an access authentication. Wherein a step of the private key application comprises:

S51, the IoT equipment to be accessed sends a private key application request to the key generation center, wherein the private key application request carries a registration ciphertext, and the registration ciphertext is generated by encrypting a registration information with the public key generated by the key generation center, the registration information comprises a second random number generated randomly and the device ID;

S52, the key generation center receives the private key application request and obtains the registration ciphertext, before decrypting the registration ciphertext with a private key thereof to obtain the registration information;

S53, the key generation center calculates respectively a signature private key and a data encryption private key of the IoT equipment to be accessed according to the registration information, encrypts the registration result according to the second random number, before sending to the IoT equipment to be accessed, wherein the registration result comprises the signature private key and the encryption private key of the IoT equipment to be accessed.

Specifically, the IOT equipment to be accessed sends the registration information generated by the device ID, the second random number, and more, to the key generation center (that is, a private key generation unit), and the registration information is encrypted with the public key of the key generation center to obtain the registration ciphertext, the registration ciphertext is sent to the key generation center, and the key generation center decrypts the registration ciphertext with the private key after receiving the registration ciphertext, and obtains the registration information, then calculates the signature private key and the encryption private key of the IoT equipment to be accessed respectively according to the registration information, while feeding back a registration result to the IoT equipment to be accessed, that is, sending the registration result to the IoT equipment to be accessed in an encryption manner with the second random number. In such a way, the data is ensured not to be damaged during a data transmission process by the encryption method, an integrity of the data transmission is improved.

A plurality of steps of the access authentication comprises:

S54, the IoT equipment to be accessed selects the second random number as a symmetric key, and encrypts a symmetric key plaintext by the encryption private key thereof to obtain an access authentication ciphertext;

S55, the IoT equipment to be accessed signs the access authentication application information with the signature private key, to obtain the signature information of the IoT equipment to be accessed, then sends the access authentication application information and the signature information to the IoT access platform; wherein, the access authentication application information comprises the access authentication ciphertext, the device ID, a key application time, and a key validity period;

S56, the IoT access platform performs an access authentication to the IoT equipment to be accessed and the signature information thereof, before feeding back an access authentication result to the IoT equipment to be accessed;

Further, the IoT equipment 1 to be accessed selects the second random number as the symmetric key, and encrypts the symmetric key plaintext (such as a registration information) with its own encryption private key, and obtains an access authentication ciphertext, then takes the access authentication ciphertext, a device ID, a key application time and a validity period of the access authentication ciphertext as an access authentication application information, and signs the access authentication application information with the signature private key of the IoT equipment 1 to be accessed, to obtain the signature information, and the authentication application information and the signature information are both sent to the IoT access platform 2 (that is, a convergence node/an access node). After being received by the IoT access platform 2 and verified by the SM9 two-way credibility verification unit, an access authentication result will be fed back to the IoT equipment 1 to be accessed. If the access authentication result is success, it indicates that the IoT equipment 1 to be accessed has successfully connected to the IoT access platform 2. If the access authentication result is failed, it indicates that the access of the IoT equipment 1 to be accessed has failed, and at a same time, the IoT equipment 1 to be accessed receives a reason for the failure prompted by the IoT access platform 2, such as an incorrect password and more.

A step of the verification by the SM9 two-way credibility verification unit 2023, that is, the IoT access platform 2 performs the access authentication to the IoT equipment 1 to be accessed and the signature information, comprises:

S561, the IoT access platform 2 extracts the key application time and the key validity period from the access authentication application information to verify whether the key has expired or not;

S562, when determining that the key has not expired, the IoT access platform 2 verifies the signature information of the access authentication application information to determine whether the access authentication application information is complete;

S563, when determining that the signature information of the access authentication application information is correct, the IoT access platform 2 extracts and uses the symmetric key to decrypt the access authentication ciphertext in the access authentication application information;

S564, when decrypting successfully and obtaining the symmetrically encrypted plaintext, the IoT access platform 2 determines that the IoT equipment 1 to be accessed has successfully accessed the IoT access platform 2, before feeding back the access authentication result of access success to the IoT equipment 1 to be accessed.

That is, after extracting the device ID, the key application time and the key validity period of the IoT equipment 1 to be accessed by the SM9 two-way credibility verification unit 2023, and verifying in three steps, only when all the three steps verification are successful will the access authentication result of access success be sent to the IoT equipment 1 to be accessed, a first step is verifying whether the key has expired, a second step is verifying the signature information of the access authentication application information, and a third step is taking out and decrypting the symmetric key ciphertext, before obtaining the symmetric key plaintext, after all the three steps success, the authentication of the IoT equipment to be accessed successes.

S60, when the access authentication result received by the IoT equipment 1 to be accessed is the access authentication success, the IoT equipment 1 to be accessed accesses the IoT access platform successfully.

In the present embodiment, the access authentication result is success, means the IoT equipment 1 to be accessed will access the IoT access platform 2 successfully; the access authentication result is failure, means the IoT equipment 1 to be accessed will fail to access the IoT access platform 2, and the IoT equipment 1 to be accessed will receive a note from the IoT access platform 2 prompting a failure reason, such as a wrong password or more.

It should be noted that the access authentication method in the present embodiment is mainly based on an implementation of an IBC ID authentication system, which is a decentralized authentication, needs no digital certification, thus reduces an onsite implementation difficulty, and improves an efficiency of an entity ID authentication. In this way, according to an IBC security architecture based on the SM9 algorithm, a high-strength authentication and an access arbitration are performed onto the ID of the IoT equipment 1 to be accessed, so as to determine whether an IoT terminal has an access and use right to a certain resource, making an access strategy to a computer and a network system be able to be executed reliably and effectively, and preventing an attacker from impersonating a legitimate user and gaining an access to any resources.

Further, when the authentication ID of the IoT equipment 1 to be accessed or the device fingerprint changes, the IoT access platform will delete the authentication ID stored automatically, and regenerate an authentication ID through the SM9 cryptographic ID.

Further, when the IoT equipment 1 to be accessed accesses the IoT access platform 2 successfully, the data encryption and decryption module 203 in the IoT access platform 2 establishes a secure channel with the IoT equipment 1 to be accessed by a secure communication protocol, to ensure a security of transmitting data. The data encryption and decryption module 203 adopts an encryption algorithm and performs a data encryption to the IoT equipment 1 to be accessed by the symmetric encryption algorithm unit 2031, and the data encryption and decryption module 203 performs an integrity check to a communication data by the digest algorithm unit 2032, to prevent data from being attacked by eavesdropping, tampering, destruction, insertion and replaying during a transmission, and ensure a security of data transmission.

Wherein the encryption algorithm comprises a symmetric encryption algorithm and an asymmetric encryption algorithm. Wherein the symmetric encryption algorithm refers to an encryption algorithm that uses a same key for encryption and decryption, having a key not public and a character of an open algorithm, a small amount of calculation, a fast encryption speed, and a high encryption efficiency. The symmetric encryption algorithms comprises DES, TripleDES, RC2, RC4, RC5, Blowfish, SM1, SM2, and more. Of course, it is possible to change the symmetric encryption algorithm flexibly according to an actual requirement.

The asymmetric encryption algorithms requires two keys: a public key and a private key. The public key and the private key are a pair. If the public key is used to encrypt the data, only the private key paired can make a decryption; if the private key is used to encrypt the data, only the public key paired can make a decryption. In an embodiment: Party A generates a pair of keys and public one of them as a public key to a plurality of other parties; Party B obtains the public key and uses the public key to encrypt a protected information before sending to Party A; Party A then use another private key saved by itself to decrypt the information having been encrypted. In a same way, Party A may encrypt the protected information with its own private key before sending to Party B, and Party B uses the public key from Party A to decrypt the encrypted information. A characteristic of the asymmetric encryption algorithm is that a strength of the algorithm is complex, and a security depends on the algorithm, but a speed of encryption and decryption is greater than that of the symmetric encryption algorithm. The asymmetric encryption algorithms comprises RSA, ECC (for a mobile device), Diffie-Hellman, El Gamal, DSA (for a digital signature), and more.

In the present embodiment, an encryption method adopts the symmetric encryption algorithm: SM1 and SM2, and the digest algorithm is an SM3 digest algorithm, being able to reduce a resource consumption and improve a transmission speed.

Furthermore, the device fingerprint management unit 2012 of the IoT access platform 2 performs a full life cycle management to the device fingerprints, the full life cycle management comprises at least a management of application, acceptance, production, issuance, and cancellation of the device fingerprint.

According to the access method of the IoT equipment based on 5G, the present disclosure further provides an access system of the IoT equipment 1 based on 5G, shown as FIG. 1, the access system 100 of the IoT equipment based on 5G comprises an IoT equipment 1 to be accessed and an IoT access platform 2, the IoT access platform 2 comprises a device identification module 201, an ID authentication module 202, and a data encryption and decryption module 203. Only part components of the access system 100 of the IoT equipment based on 5G are shown in FIGS. 1 and 3. It should be understood that, not all components shown are required in an implementation, more or less components may be substituted in the implementation.

the IoT equipment 1 to be accessed is applied to sending an access request to the IoT access platform; and accesses the IoT access platform 2 when receiving the ID authentication result of the ID authentication success, wherein the access request carries the device ID of the IoT equipment 1 to be accessed. Details have been described in the access method of the IoT equipment based on 5G above.

The IoT access platform 2 is applied to receiving and parsing the access request to obtain the device ID, generating an authentication ID of the IoT equipment to be accessed according to the device ID, and performing an ID authentication to the IoT equipment 1 to be accessed according to the authentication ID, so as to feed back an ID authentication result to the IoT equipment 1 to be accessed. Details have been described in the access method of the IoT equipment based on 5G above.

In such a way, the present disclosure achieves providing a centralized lightweight security access service for a plurality of massive devices in the IoT, by adopting an active detection method to collect the characteristics of the IoT equipments, before generating the device fingerprints to provide a key credential for a platform security authentication, and finally realizing a secure access of massive IoT devices by adopting the IBC security architecture based on the SM9 algorithm. Therefore, the present disclosure starts from an actual threat faced by the access of massive IoT equipment in a 5G scenario, aiming at a heterogeneous characteristic of the massive IoT equipments themselves, combining the device fingerprints and the national secret technology, before designing a secure access solution for the IoT equipments, and an overall architecture of a lightweight security access platform for the IoT equipments has been constructed, forming an effective solution for the secure access of massive IoT equipments, being able to provide a plurality of security access core protection functions, including an ID authentication and a data encryption for the IoT equipments in a 5G scenario, thus reducing effectively a network security risk in the IoT, and promoting a development of the IoT based on a 5G communication technology.

According to the access method of the IoT equipment based on 5G, the present disclosure further provides a non-transitory computer-readable storage medium, the computer-readable storage medium has one or more programs stored, and the one or more programs may be executed by one or more processors (the processor in the present embodiment), to achieve a plurality of steps of the access method of the IoT equipment based on 5G. Details have been described in the access method of the IoT equipment based on 5G above. Wherein the processor, in some embodiments, may be a central processing unit (CPU), a micro-CPU, a cell phone baseband processor or a plurality of other data processing chips, applied to running a program code or a process data stored in the storage medium, for example, to executing the access method of the IoT equipment based on 5G.

All above, the present disclosure discloses an access method and system of an IoT equipment based on 5G and a storage medium, the access method of the IoT equipment based on 5G comprises a plurality of following steps: the IoT equipment to be accessed sends an access request to the IoT access platform, wherein the access request carries a device ID of the IoT equipment to be accessed; the IoT access platform receives and parses the access request to obtain the device ID, generates an authentication ID of the IoT equipment to be accessed according to the device ID, and performs an ID authentication to the IoT equipment to be accessed according to the authentication ID, so as to feed back an ID authentication result to the IoT equipment to be accessed; when the ID authentication result received by the IoT equipment to be accessed is the ID authentication success, the IoT equipment to be accessed accesses the IoT access platform. The present disclosure takes a device fingerprint as the authentication ID to verify a legal ID of the IoT equipment to be accessed, and at a same time, ensures a data integrity of the IoT equipment to be accessed through an access authentication, thereby preventing any illegal terminals from accessing the IoT access platform, and providing a security for the data transmission.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:

1. An access method of an IoT equipment based on 5G, comprising:
   an IoT equipment to be accessed sends an access request to an IoT access platform, the access request carries a device ID of the IoT equipment to be accessed;
   the IoT access platform receives and parses the access request to obtain the device ID,
   the IoT access platform generates an authentication ID of the IoT equipment to be accessed according to the device ID, by performing steps of:
   acquiring a target characteristic parameter information of the IoT equipment to be accessed according to the device ID, by determining whether the IoT equipment to be accessed is a first time access or not according to the device ID,
   wherein when it is determined that the IoT equipment to be accessed is the first time access, detecting the IoT equipment to be accessed in an active detection manner to obtain a reference characteristic parameter information of the IoT equipment to be accessed, and performing a preprocessing onto the reference characteristic parameter information to obtain the target characteristic parameter information of the IoT equipment to be accessed, wherein the preprocessing comprises an aggregation processing, a filtering processing, a characteristic extraction processing, and a clustering processing, and
   performing a Hash operation on the target characteristic parameter information and the device ID to obtain the authentication ID of the IoT equipment to be accessed, and
   the IoT access platform performs an ID authentication to the IoT equipment to be accessed according to the authentication ID, so as to feed back an ID authentication result to the IoT equipment to be accessed; and
   when the ID authentication result received by the IoT equipment to be accessed is the ID authentication success, the IoT equipment to be accessed accesses the IoT access platform.

2. The access method according to claim 1, wherein the IoT access platform performs the ID authentication to the IoT equipment to be accessed according to the authentication ID, so as to feed back the ID authentication result to the IoT equipment to be accessed, comprising:
   the IOT access platform generates an SM9 cryptographic ID of the authentication ID through an SM9 ID based cryptographic algorithms, and takes the SM9 cryptographic ID as a public key;
   the IoT access platform calculates an SM9 algorithm private key of the IoT equipment to be accessed by a key generation center, and generates randomly a first random number;
   the IoT access platform sends the SM9 algorithm private key and the first random number to the IoT equipment to be accessed, to obtain a signature information of the IoT equipment to be accessed;
   after receiving the signature information, the IoT access platform verifies the signature information with the authentication ID, to determine whether the IoT equipment to be accessed is a legitimate terminal or not;
   when the signature information is consistent with the authentication ID, it is determined that the IoT equipment to be accessed is a legitimate terminal, then the IoT access platform feeds back an ID authentication result of the ID authentication success to the IoT equipment to be accessed; and
   when the signature information is inconsistent with the authentication ID, it is determined that the IoT equipment to be accessed is an illegal terminal, then the IoT access platform feeds back an ID authentication result of the ID authentication failure to the IoT equipment to be accessed.

3. The access method according to claim 1, further comprising:
   the IoT equipment to be accessed sends a private key application request to a key generation center, the private key application request carries a registration ciphertext, and the registration ciphertext is generated by encrypting a registration information with the public key generated by the key generation center, the registration information comprises a second random number generated randomly and the device ID;

the key generation center receives the private key application request and obtains the registration ciphertext, before decrypting the registration ciphertext with a private key thereof to obtain the registration information; and the key generation center calculates respectively a signature private key and a data encryption private key of the IoT equipment to be accessed according to the registration information, encrypts a registration result according to the second random number, before sending to the IoT equipment to be accessed, the registration result comprises the signature private key and the encryption private key of the IoT equipment to be accessed.

4. The access method according to claim 3, wherein when the ID authentication result received by the IoT equipment to be accessed is the ID authentication success, the IoT equipment to be accessed accesses the IoT access platform, further comprising thereafter:

the IoT equipment to be accessed selects the second random number as a symmetric key, and encrypts a symmetric key plaintext by the encryption private key thereof to obtain an access authentication ciphertext;

the IoT equipment to be accessed signs access authentication application information with the signature private key, to obtain signature information of the IoT equipment to be accessed, then sends the access authentication application information and the signature information to the IoT access platform; the access authentication application information comprises the access authentication ciphertext, the device ID, a key application time, and a key validity period;

the IoT access platform performs an access authentication to the IoT equipment to be accessed and the signature information thereof, before feeding back an access authentication result to the IoT equipment to be accessed; and when the access authentication result received by the IoT equipment to be accessed is the access authentication success, the IoT equipment to be accessed accesses the IoT access platform successfully.

5. The access method according to claim 4, wherein the IoT access platform performs the access authentication to the IoT equipment to be accessed and the signature information thereof, comprising:

the IoT access platform extracts the key application time and the key validity period from the access authentication application information to verify whether the key has expired or not;

when determining that the key has not expired, the IoT access platform verifies the signature information of the access authentication application information to determine whether the access authentication application information is complete;

when determining that the signature information of the access authentication application information is correct, the IoT access platform extracts and decrypts the access authentication ciphertext in the access authentication application information by the symmetric key; and when decrypting successfully and obtaining the symmetrically encrypted plaintext, the IoT access platform determines that the IoT equipment to be accessed has successfully accessed the IoT access platform, and feeds back the access authentication result of access success to the IoT equipment to be accessed.

6. The access method according to claim 1, wherein when the access authentication result received by the IoT equipment to be accessed is the access authentication success, the IoT equipment to be accessed accesses the IoT access platform successfully, comprising thereafter:

the IoT equipment to be accessed performs a data communication with the IoT access platform through an encryption algorithm, the encryption algorithm comprises a symmetric encryption algorithm and an asymmetric encryption algorithm.

7. An access system of the IoT equipment based on 5G, to realize the access method of the IoT equipment based on 5G according to claim 1, wherein the access system of the IoT equipment based on 5G comprises an IoT equipment to be accessed and an IoT access platform, and the IoT access platform comprises a device identification module, an ID authentication module, and a data encryption and decryption module;

the IoT equipment to be accessed is applied to sending an access request to the IoT access platform; and accesses the IoT access platform when receiving the ID authentication result of the ID authentication success, the access request carries a device ID of the IoT equipment to be accessed; and the IoT access platform is applied to receiving and parsing the access request to obtain the device ID, generating an authentication ID of the IoT equipment to be accessed according to the device ID, and performing an ID authentication to the IoT equipment to be accessed according to the authentication ID, so as to feed back an ID authentication result to the IoT equipment to be accessed.

8. A non-transitory computer-readable storage medium, wherein achieving a plurality of steps of the access method of the IoT equipment based on 5G according to claim 1, when a processor is executing a plurality of instructions stored in the storage medium.

* * * * *